Jan. 31, 1967  E. S. CHALPIN ETAL  3,301,007

FLEXIBLE TORQUE COUPLING

Filed March 27, 1964  3 Sheets-Sheet 1

EDWARD S. CHALPIN
DAVID E. HANSON
INVENTORS

BY *Blair and Buckles*

ATTORNEYS

Jan. 31, 1967  E. S. CHALPIN ETAL  3,301,007
FLEXIBLE TORQUE COUPLING

Filed March 27, 1964  3 Sheets-Sheet 2

EDWARD S. CHALPIN
DAVID E. HANSON
  *INVENTORS*

BY  *Blair and Buckles*

ATTORNEYS

Jan. 31, 1967 E. S. CHALPIN ETAL 3,301,007
FLEXIBLE TORQUE COUPLING
Filed March 27, 1964 3 Sheets-Sheet 3

EDWARD S. CHALPIN
DAVID E. HANSON
INVENTORS

BY *Blair and Buckles*
ATTORNEYS ns, Brockton, Mass., assignors to Metal Bellows Corporation, Sharon, Mass.
United States Patent Office 3,301,007
Patented Jan. 31, 1967

3,301,007
FLEXIBLE TORQUE COUPLING
Edward S. Chalpin, Glendora, Calif., and David E. Hanson, Brockton, Mass., assignors to Metal Bellows Corporation, Sharon, Mass.
Filed Mar. 27, 1964, Ser. No. 355,376
17 Claims. (Cl. 64—15)

This invention relates to a flexible torque coupling having fail-safe features. The coupling has a continuously engaged bellows-type torque transferring unit and a second torque transferring unit. The second unit remains disengaged so long as the continuously engaged unit is intact, and automatically engages upon failure of the first unit.

The invention also provides a novel low-cost construction for a bellows coupling and comprehends a method for manufacturing it.

Flexible torque couplings of the present kind are capable of transferring torque between two shafts that are subject to independent, or differential, lateral and longitudinal motions as well as angular deflection. One construction for such shaft couplings utilizes bellows. Advantages of the bellows-type flexible torque couplings include the absence of frictional wear between elements of the couplings, and high flexibility to accommodate lateral, longitudinal, and angular misalignment. This latter feature allows the coupled shafts to be substantially misaligned and yet have minimal lateral and bending stresses.

Moreover, the full symmetry of the bellows around the axis of rotation can provide a constant speed characteristic. In addition, the bellows elements in such devices may be constructed with sufficient torsional rigidity to prevent appreciable relative rotational displacement between the coupled shafts. Put another way, the rotational movement of the driving shaft is precisely communicated to the driven shaft, since there is no inherent slack or play in the coupling.

However, the use of flexible bellows-type couplings has often been retarded due to their generally lower strength compared with other torque couplings of lesser flexibility. Specifically, although the diaphragms or bellows elements of a bellows coupling provide an extremely high strength coupling having remarkably low stress concentrations, they are subject to failure, particularly when inadvertently damaged by an external force.

Another problem with prior bellows-type couplings is their relatively high cost, which precludes their use in applications where cost is a prime consideration.

Accordingly, an object of the present invention is to provide a fail-safe torque coupling characterized by high performance prior to failure and continued operation in the event of failure.

Another object of the invention is to provide a fail-safe flexible torque coupling that has high torsional rigidity together with lateral flexibility.

Another object of the invention is to provide a fail-safe flexible torque coupling that is compact and has light weight. The coupling should also have low inertia.

A further object of the invention is to provide a bellows-type flexible torque coupling having fail-safe operation.

A further object is to provide an improved flexible shaft coupling of economical and simplified design.

It is also an object of the invention to provide a method for fabricating metal bellows couplings of the above character at low cost.

Other objects of the invention will in part be obvious and will in part appear hereinafter.

The invention accordingly comprises the features of construction, combinations of elements, and arrangements of parts which will be exemplified in the constructions hereinafter set forth, and the several steps for making these constructions and the relation of one or more of such steps with respect to each of the others, and the scope of the invention will be indicated in the claims.

For a fuller understanding of the nature and objects of the invention, reference should be had to the following detailed description taken in connection with the accompanying drawing, in which.

A fail-safe coupling embodying the invention has a primary bellows coupling unit connecting a driving member with a driven member. Also connected between the two members, which are appropriately shaft-receiving hubs, is a secondary coupling unit. The torsional rigidity of the primary unit maintains the secondary unit disengaged so that the connection between the hubs has high flexibility, except for torsional stresses.

In the event that the primary coupling fails, or the torsional rigidity of the primary unit otherwise decreases to allow the hubs to become torsionally offset, the secondary unit engages and commences to transfer the torsional load between the hubs.

In this manner, the coupling combines the highly desirable operating characteristics of bellows-type flexible torque couplings with high reliability. The invention thus enables bellows-type couplings, with their inherent features of relatively silent, lubrication-free and non-wearing operation to be used in critical applications where safety and reliability are prime considerations. One such application is in the steering mechanism of motor vehicles.

Figure 1:
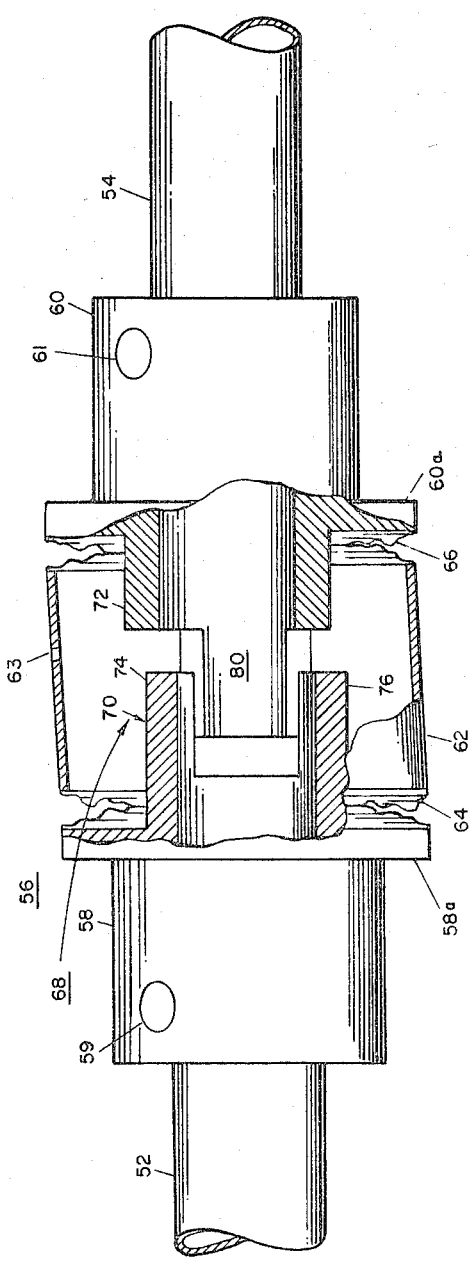
FIG. 1 is a side elevation view, partly broken away, of a fail-safe flexible shaft coupling embodying the invention, shown connected between misaligned shafts.
Figure 2:
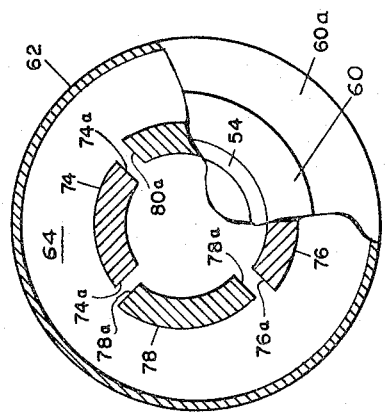
FIG. 2 is an end view, partly broken away, of the coupling of FIG. 1.

More specifically, as shown in FIGS. 1 and 2, a coupling indicated generally at 50 interconnects shafts 52 and 54. The coupling has a primary coupling unit indicated generally at 56, connected between axially spaced, shaft-receiving hubs 58 and 60. The primary coupling unit 56, in turn, comprises an elongated, rigid cylinder 62 connected between bellows 64 and 66 that are connected at their other ends to the hub flanges 58a and 60a respectively.

The coupling 50 also has a secondary coupling unit indicated generally at 68, comprising disengaged sections 70 and 72 connected with the hubs 58 and 60, respectively, and disposed coaxially within the cylinder 62 of the primary unit. The sections 70 and 72 are adapted to engage each other and transfer torque between the shafts 52 and 54 in the event the primary coupling unit 56 fails.

In the illustrated embodiment, a pair of opposed arcuate lugs 74 and 76, integral with the hub 58, form the section 70. The lugs 74 and 76 extend axially toward the hub 60 to interleave with an identical pair of opposed arcuate lugs 78 and 80 (FIG. 2), integral with the hub 60 and forming the coupling section 72.

Figure 3:
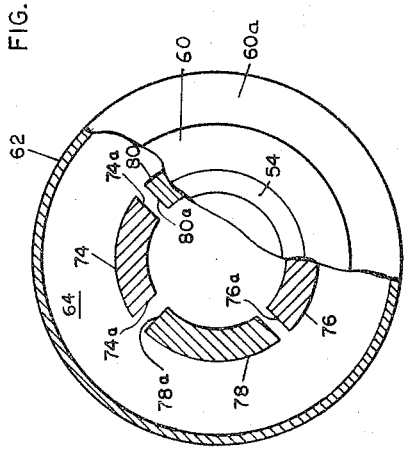
FIG. 3 is an end view, similar to FIG. 2, of the coupling of FIG. 1 with the elements thereof aligned.

As best seen in FIG. 3, where the hubs are in alignment, the lugs 74–80 are equally spaced around the circumference of a common circle with each lug of the section 70 between lugs of the section 72 and vice versa.

Radially extending surfaces 74a, 76a, 78a and 80a on the lugs are circumferentially spaced from mating surfaces on adjacent lugs.

The bellows 64 and 66 are preferably of welded metal construction, with a plurality of generally frustro-conical diaphragms as shown. The diaphragms are rippled with a radial succession of circumferentially extending undulations to increase their flexibility and their resistance to buckling deformation under high torque loads.

The flanges 58a and 60a may be integral with the hubs, as shown, or formed of sheet stock and secured to the hubs as by welding or brazing. The shafts 52 and 54 are secured in the hubs 58 and 60 in a conventional manner, e.g. with pins 59 and 61.

It has also been found that the bellows-cylinder and bellows-hub connections are preferably continuous around the entire bellows periphery so that the coupling provides constant-speed operation. In the absence of continuous weld or similar connection, sufficient deformation can occur when the hubs are offset from each other to cause speed variations.

During operation, the coupling 50 efficiently transfers torque between the shafts 52 and 54 with relatively quiet and friction free operation. Moreover, the coupling has no noticeable torsional windup and hence it maintains a substantially fixed relative rotational orientation of the the shafts 52 and 54, and the elements of the coupling.

The circumferential spacing between the adjacent lugs of the secondary coupling unit 68 is sufficient to prevent contact between them as long as the primary unit 56 remains intact. Such contact would decrease the coupling's flexibility and hence its misalignment accommodation, in addition to producing some noise and wear during operation.

Accordingly, when the shafts 52 and 54 are in the position of maximum lateral misalignment, as shown in FIGS. 1 and 3, the lugs 74 and 76 of the coupling section 70 are still disengaged from the lugs 78 and 80. However, if the primary coupling unit 56 fails, the adjacent lugs of the two coupling sections 70 and 72 will undergo relative rotation and thus engage each other and continue to transfer torque between the hubs 58 and 60 and the shafts connected thereto. It will also be seen that when the secondary coupling unit is brought into action by failure of the primary unit, the coupling 50 still accommodates misalignment of the coupled shafts 52 and 54, although not with the same high efficiency and flexibility it had prior to such failure.

The construction of the coupling 50 shown in FIG. 1 provides a high degree of protection for the relatively fragile bellows 64 and 66, since the outer radial dimensions of the cylinder 62 and hub flanges 58a and 60a are at least as large as the bellows, and hence shield the bellows from inadvertent damage. Moreover, even with added parts, the coupling has low inertia and small size.

Figure 4:
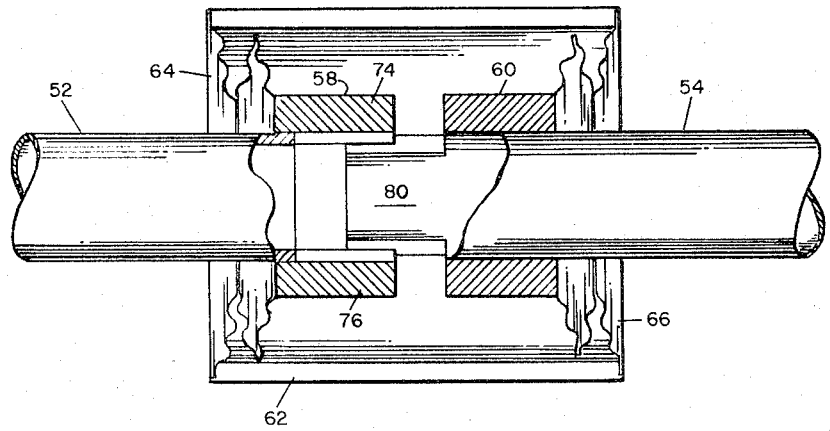
FIG. 4 is a longitudinal section of a modified construction for the coupling of FIG. 1.

FIG. 4 shows an alternative construction for the fail-safe coupling and comprises the same elements as the coupling 50. However, in FIG. 4, the bellows 64 and 66 and the hubs 58 and 60 are disposed within the cylinder 62 rather than axially spaced therefrom as in FIG. 1. Further, the coupling of FIG. 4 does not have hub flanges.

In the couplings described above, the cylinder between the bellows may be replaced with other shaft-like torque-transferring structures. It should also be noted that the interior of the coupling is vented through a hole 63 (FIG. 1) in the cylinder 62 to have the same pressure as the environment.

Figure 5:
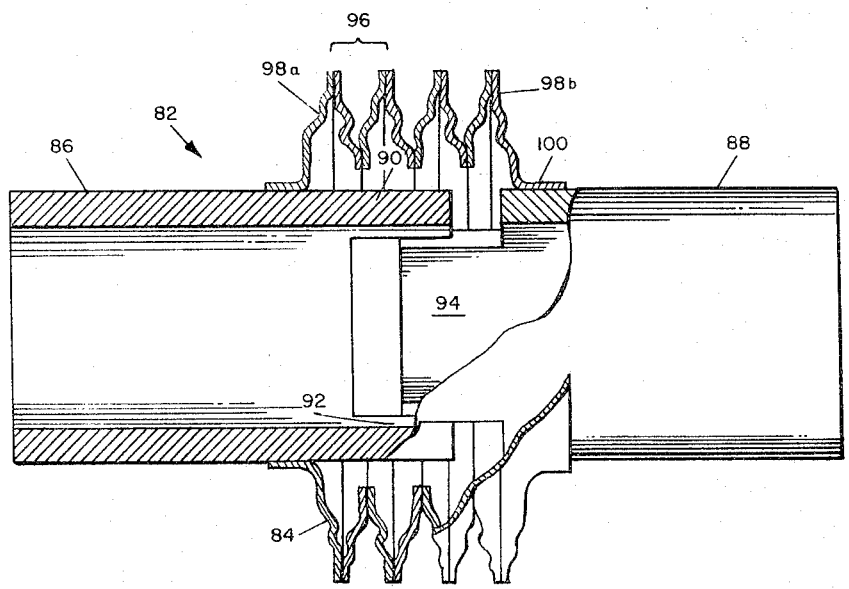
FIG. 5 is a side view, partly broken away, of a single-bellows fail-safe coupling.

As shown in FIG. 5, the fail-safe features of the invention are also suited for use in a single-bellows coupling. A coupling indicated generally at 82 includes a bellows 84 interconnecting axially-spaced cylindrical hubs 86 and 88. The hub 86 has lugs 90 and 92 interleaved with lugs 94 and 96 of the hub 88.

The bellows 84 preferably comprises a plurality of convolutions 96, each formed with a pair of rippled frusto-conical diaphragms 98 arranged back to back and welded together at their inner rims. The convolutions are joined by welding together the mating outer rims of adjacent diaphragms. The end diaphragms 98a and 98b have axially extending inner rims 100 permanently joined with the hubs 86 and 88, by welding, brazing, or a suitable cement such as an epoxy.

Still considering FIG. 5, the single-bellows coupling 82 may also be constructed with annular flanges (not shown) on each of the hubs 86 and 88 and preferably having a diameter at least as great as the outer diameter of the bellows 84. Such flanges will largely protect the bellows 84 from inadvertent damage. When protective flanges are thus provided, the bellows 84 may remain secured to the hubs as shown, or have its outer end rims secured to the flanges in a manner similar to that shown in FIG. 1.

Figure 6:
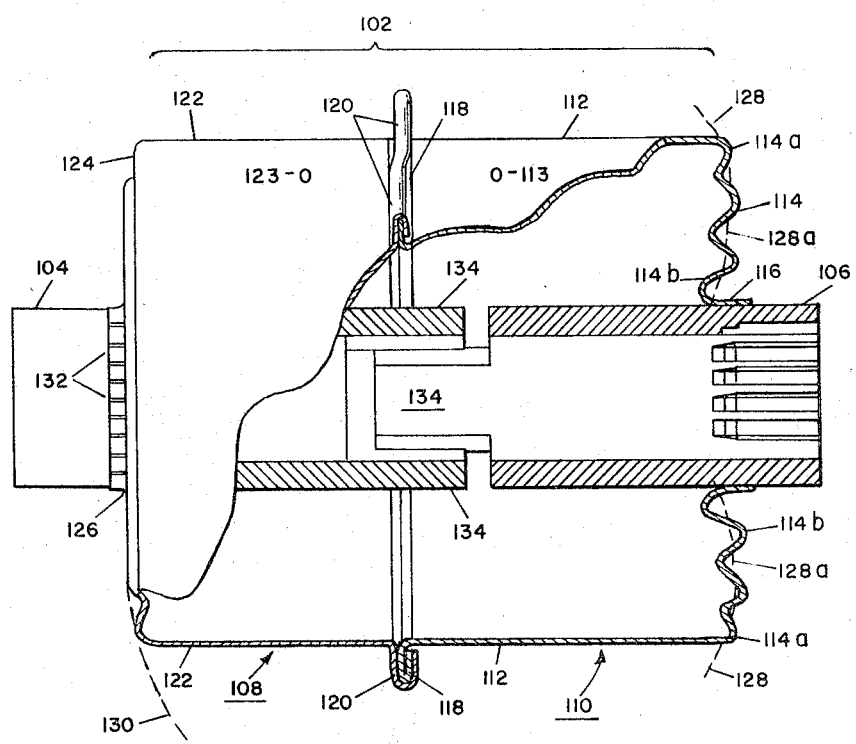
FIG. 6 is a side view, partly broken away, of a low cost shaft coupling embodying the invention.

FIG. 6 shows a coupling embodying the invention and characterized by a low-cost construction and high performance. The coupling comprises a two-piece bellows unit 102 interconnecting axially spaced tubular hubs 104 and 106. Two preferably identical cups 108 and 110 constitute the bellows unit 102. The cup 110 has a cylindrical wall 112 and is bottomed with a bellows diaphragm 114. The diaphragm 114 has an inner cylindrical rim 116 secured to the hub 106. The cup wall 112 flares out and forms an annular rim 118 that is secured to a mating rim 120 flaring out from the wall 122 of the cup 108. The cup 108 also has a bellows diaphragm 124 terminating at its inner edge in a cylindrical rim 126 secured to the hub 104. The cups have vent holes 113 and 123.

As also shown in FIG. 6, the bellows diaphragms 114 and 124 are preferably rippled with a radial succession of circumferential undulations. As shown on the diaphragm 114, the radially outermost undulation 114a has relatively large curvature; that is, a relatively small radius of curvature. The curvature of the undulations successively decreases in the direction of decreasing radius, so that the inner undulation 114b has a relatively small curvature. Thus, the axial amplitude of the undulations and the widths thereof in the radial direction increase in the direction of decreasing radius. This rippling construction with decreasing curvature appears to distribute stresses fairly evenly along the radial dimension of the diaphragm, thereby minimizing stress concentrations.

Figure 6A:
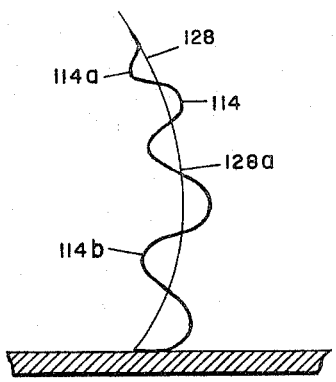
FIG. 6A is an enlarged fragmentary view of one diaphragm of the coupling of FIG. 6.

The diaphragm 114 is also radially bowed along a curve 128, with the rippling undulations superimposed on the curve as indicated in greater detail in FIG. 6A. It has been found that such bowing of the diaphragm increases its flexibility, particularly in the axial direction, and increases the operating life of the bellows unit.

The center of curvature of the curve 128 preferably lies between the wall 112 and the inner rim 116. Thus, the curve is double-valued in the radial direction and has a "crest" 128a intermediate the inner rim 116 and the outer wall 112.

The diaphragm 124 is preferably identical to the diaphragm 114 and bowed opposite to the diaphragm 114 along a curve 130 identical to the curve 128.

The cups 108 and 110 of the coupling 102 are readily fabricated at low cost from sheet stock by a conventional drawing operation. Since the cups 108 and 110 are identical, they can be formed with the same dies. The drawing operation forms both rims (e.g. 116 and 118) and the diaphragm. Thereafter, the cups are axially positioned on the hubs 104 and 106 and secured thereto. By way of example, this may be done by seam welding, in which a series of spaced axial line welds 132, shown uniting the rim 126 with the hub 104, are rapidly formed about the periphery of the rims. One construction for seam welding apparatus utilizes a toothed wheel as the welding electrode. The welding voltage is applied between the hub and the tooth wheel and as the wheel is "rolled" around the rim 126, it draws an arc between each tooth of the wheel and the rim to form the line weld. Other welding or brazing techniques can alternatively be used to secure the cups to the hubs. However, we have found it preferable to accomplish the desired banding by means of adhesives such as epoxy, which provide uniform stress concentration in the cups all the way around the hubs 104 and 106.

The rims 118 and 120 of the cups 108 and 110, respectively, are then joined together. In the illustrated embodiment, they are rolled and crimped. Adjacent, circumferentially-spaced sections of the abutting rims are crimped and offset in opposite axial directions, so that the conjoined rims 118 and 120 form an axially undulating path, as shown. This construction, readily performed with conventional equipment, prevents the cups from slipping with respect to each other, even under high torque loads.

The coupling structure of FIG. 6 may incorporate a second coupling unit for fail-safe operation. For this purpose, in the illustrated embodiment, the hubs 104 and 106 are formed with pairs of opposed interfitting lugs 134 similar to those disclosed above with reference to FIGS. 1, 2 and 3.

The hubs 104 and 106 are fabricated from conventional tube stock and the fail-safe coupling lugs are automatically formed by removing the tube portions between the lugs on each hub. This operation is readily adapted to mass-production techniques such as punching, etc.

The shaft-receiving ends of the hubs may be broached to form splines, as shown at 132 on the hub 106, which securely engage shafts fitted therein.

When the coupling 102 does not have the fail-safe lugs 134, the cups 108 and 110 can be very shallow, with short walls 112 and 122.

The high performance, strength, ruggedness and reliability, and the low cost of the coupling shown in FIG. 6 renders it highly suited for many applications, one of which is as a universal connection in a drive shaft.

The invention thus provides a flexible shaft coupling in which the fragile metallic bellows elements are effectively protected from damage. This is accomplished in a simple and ingenious manner by providing an elongated cylinder of sufficient size to extend radially beyond the bellows affixed thereto. By this arrangement, the cylinder effectively absorbs the impact of accidental blows, thereby preventing damage to the bellows.

The fail-safe bellows shaft couplings described above also provide a remarkably high degree of reliability without interfering with their high misalignment flexibility. Moreover, the low cost and light weight embodiment described above overcomes substantial practical problems that heretofore have precluded the use of low-noise frictionless and lubrication-free bellows couplings in many machines.

It will thus be seen that the objects set forth above, among those made apparent from the preceding description, are efficiently attained and, since certain changes may be made in carrying out the above methods and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

We claim:

1. A fail-safe flexible torque coupling for transferring rotational motion between driving and driven shafts, said coupling comprising
   (A) first and second shaft-receiving hubs,
   (B) first and second bellows secured respectively to said first and second hubs,
   (C) a hollow torque-transferring member having an axis of rotation, said member interconnecting said bellows and forming with said bellows a primary coupling unit,
   (D) said first and second bellows being contained within said torque-transferring member, and
   (E) first and second secondary torque-transferring means
       (1) connected respectively to said first and second hubs,
       (2) disposed coaxially within said torque-transferring member and extending along said axis and interfitting with each other for transferring torque between said hubs when said primary coupling unit fails, and
       (3) held in disengagement from each other by said primary coupling unit.

2. A flexible torque coupling comprising in combination
   (A) first and second hubs, each of which has first and second ends spaced apart along the axis thereof, each hub having
       (1) an axial bore extending through it,
       (2) shaft-retaining means for securing a shaft in said bore,
       (3) a pair of arcuate lugs extending axially at its second end and symmetrically spaced apart about said bore to interfit with the lugs on the other hub, and
       (4) a radially-extending flange intermediate said first and second ends,
   (B) first and second metal bellows, each of which has axially-spaced ends,
       (1) each bellows having a plurality of rippled diaphragms with nesting undulations,
       (2) an end of each bellows being secured to said flange on one hub, and
   (C) a metal cylinder having an axis of rotation,
       (1) said cylinder having axially-spaced ends secured to the other ends of said bellows,
       (2) said cylinder and bellows interconnecting said hubs with the first ends of said hubs spaced apart along said axis of rotation and with each lug fitting between and circumferentially spaced from lugs of the other hub,
       (3) said cylinder being coaxially outside said interleaved lugs.

3. A flexible torque coupling comprising
   (A) a pair of interconnected opposed coupling members, each of which has an axis of rotation and consists of only one piece of relatively thin sheet-like material having
       (1) a tubular portion axially extending toward the other member,
       (2) an end rim radially extending from said tubular portion and secured to a corresponding rim on said other member to provide said interconnection,
       (3) a diaphragm radially extending from said tubular portion at its end remote from said rim, and
       (4) torque-transmitting means adjoining a circumferential path on said diaphragm which is radially spaced from said tubular portion.

4. The coupling defined in claim 3 in which
   (A) each member is cup-shaped, with said diaphragm extending radially inward from said tubular portion.

5. A torque coupling as defined in claim 3 in which each diaphragm is axially rippled with a radial succession of circumferential undulations.

6. A torque coupling as defined in claim 3 in which
   (A) each diaphragm has an annular-like shape with an inner periphery and an outer periphery,
   (B) said tubular portion adjoins said diaphragm at said outer periphery, and (C) said torque-transmitting means adjoins said diaphragm at said inner periphery.

7. A flexible torque coupling comprising
 (A) a pair of opposed coupling members, each member having an axis of rotation and
   (1) a tubular portion axially extending toward the other member,
   (2) an end rim radially extending from said tubular portion and secured to a corresponding rim on said other member,
   (3) a diaphragm integral with said tubular portion at its end remote from said rim, said diaphragm radially extending from said tubular portion and being bowed in the axial direction, and
   (4) torque-transmitting means connected with each diaphragm at a position thereon radially spaced from said tubular portion.

8. A flexible torque coupling comprising in combination
 (A) a pair of opposed coupling members, each member having an axis of rotation and
   (1) a tubular portion axially extending toward the other member,
   (2) an end rim extending from said tubular portion and secured to a corresponding rim of said other member,
   (3) a diaphragm integral with and extending radially from, said tubular portion at its end remote from said rim, and
   (4) torque-transmitting means connected with each diaphragm at a position thereon radially spaced from said tubular portion,
 (B) said diaphragms being bowed in opposite directions along said axis, and each diaphragm being bowed along a curve having a center of curvature lying radially between said tubular portion and said torque-transmitting means.

9. A flexible torque coupling comprising in combination
 (A) first and second diaphragms, each of which has a first planar periphery, each diaphragm
   (1) having annular stress-distributing undulations and
   (2) being bowed transverse to the plane of said first periphery,
 (B) a torsionally-rigid member
   (1) having an axis of rotation and having a bore along said axis and
   (2) being connected between said diaphragms at said first peripheries thereof, and
 (C) first and second torque-transferring means connected respectively to said first and second diaphragms, the connections of said torque-transferring means with said diaphragms being radially offset from said first peripheries.

10. The coupling defined in claim 9 in which the curvatures of different undulations decrease in the direction of decreasing radius.

11. The coupling defined in claim 9 in which said diaphragms are bowed in opposite directions.

12. The coupling defined in claim 9 in which
 (A) said torsionally-rigid member comprises first and second interconnected tubular members and
 (B) a first single piece of thin sheet material forms said first tubular member and said first diaphragm and
 (C) a second single piece of thin sheet material forms said second tubular member and said second diaphragm.

13. The coupling defined in claim 9 in which
 (A) the curvatures of different undulations decrease in the direction of decreasing radius and
 (B) said diaphragm are bowed in opposite directions along identical curves each of which has a center of curvature positioned radially between said first periphery and said torque-transferring means.

14. The coupling defined in claim 13 in which
 (A) said member comprises two interconnected sections, each section being integral with one of said diaphragms, and
 (B) said torque-transmitting means on each diaphragm is a cylindrical rim coaxial with said member.

15. A flexible torque coupling comprising, in combination,
 (A) first and second shaft-receiving hubs,
 (B) a pair of identical interconnected opposed cups having a common axis of rotation, each cup having
   (1) an annular outer rim secured to the corresponding rim of the other cup,
   (2) a torsionally rigid tubular wall integral with said outer rim and extending axially from said outer rim,
   (3) a diaphragm integral with said wall and extending radially inward at an end of said wall remote from said outer rim, and
   (4) a cylindrical inner rim at the inner periphery of said diaphragm and connected to one of said hubs for transmitting torque between said hub and said cup,
     (a) each diaphragm having radially-spaced undulations, each undulation having less curvature than the adjacent undulation in the direction of increasing radius,
     (b) said diaphragms being axially bowed in opposite directions with said undulations being superimposed on the bowed diaphragms.

16. The coupling defined in claim 15 in which each hub has
 (A) an axially extending central bore,
 (B) at least two lugs axially extending toward the other hub,
   (1) said lugs of said first and second hubs being spaced apart on a common circle about said bore,
   (2) each lug on said first hub being disposed between two lugs on said second hub and circumferentially spaced therefrom,
   (3) so that upon torsional failure of said cups, said lugs on different hubs engage each other and transmit torque between said hubs.

17. A flexible torque coupling comprising
 (A) a pair of interconnected opposed torque-transferring cups having a substantially common axis of rotation, each cup having
   (1) an end rim secured to the corresponding rim of the other cup,
   (2) a torsionally-rigid tubular member joined at one end to said end rim and extending axially therefrom,
   (3) a diaphragm
     (a) joined to said tubular member at the end thereof remote from said end rim, and
     (b) extending radially inward,
   (4) hub means joined to said diaphragm at the inner periphery thereof for connection to a rotatable member and for transmitting torque between the rotatable member and said cup,
   (5) at least two lugs joined to said hub means and axially extending toward the other cup,
     (a) said lugs of both said cups being spaced apart on a common circle about said rotation axis,
     (b) each lug on a first of said cups being disposed between two lugs on the second of said cups and circumferentially spaced therefrom, (c) so that upon torsional failure of said end rims, tubular members or diaphragms, said lugs on the two cups engage each other and transmit torque betwen said hub means.

References Cited by the Examiner

UNITED STATES PATENTS

| | | | |
|---|---|---|---|
| 1,471,143 | 10/1923 | Cromwell | 64—15 |
| 1,752,106 | 3/1930 | Persons | 64—13 |
| 1,871,227 | 8/1932 | Smith et al. | 64—13 |
| 2,871,885 | 2/1959 | Ray | 285—226 X |
| 2,964,958 | 12/1960 | Morrison et al. | 64—13 X |
| 3,000,089 | 9/1961 | Baker et al. | 29—436 |
| 3,046,759 | 7/1962 | Deford et al. | 64—11 |
| 3,082,613 | 3/1963 | Reed | 64—11 |
| 3,131,468 | 5/1964 | Jordan et al. | 29—436 |
| 3,233,428 | 2/1966 | Chalpin | 64—15 |

FOREIGN PATENTS

| | | |
|---|---|---|
| 923,640 | 2/1955 | Germany. |
| 558,691 | 1/1944 | Great Britain. |
| 564,963 | 10/1944 | Great Britain. |

FRED C. MATTERN, JR., *Primary Examiner.*

HALL C. COE, *Examiner.*